(12) United States Patent
Schwager et al.

(10) Patent No.: US 8,743,929 B2
(45) Date of Patent: Jun. 3, 2014

(54) DIVISION OF BIT STREAMS TO PRODUCE SPATIAL PATHS FOR MULTICARRIER TRANSMISSION

(75) Inventors: Andreas Schwager, Waiblingen (DE); Weiyun Lu, Stuttgart (DE); Lothar Stadelmeier, Stuttgart (DE)

(73) Assignee: SONY Corporation, Tokyo (JP)

( * ) Notice: Subject to any disclaimer, the term of this patent is extended or adjusted under 35 U.S.C. 154(b) by 50 days.

(21) Appl. No.: 13/254,126

(22) PCT Filed: Jan. 27, 2010

(86) PCT No.: PCT/EP2010/050882
§ 371 (c)(1),
(2), (4) Date: Aug. 31, 2011

(87) PCT Pub. No.: WO2010/108707
PCT Pub. Date: Sep. 30, 2010

(65) Prior Publication Data
US 2011/0317784 A1   Dec. 29, 2011

(30) Foreign Application Priority Data
Mar. 27, 2009   (EP) .................................. 09156480

(51) Int. Cl.
H04B 1/00   (2006.01)

(52) U.S. Cl.
USPC ........... 375/147; 375/148; 327/164; 370/203; 370/208; 370/209; 370/320

(58) Field of Classification Search
USPC ....................................................... 375/148
See application file for complete search history.

(56) References Cited

U.S. PATENT DOCUMENTS

| | | | |
|---|---|---|---|
| 6,667,961 B1 * | 12/2003 | Park et al. | 370/331 |
| 2003/0156014 A1 | 8/2003 | Kodama et al. | |
| 2005/0064908 A1 * | 3/2005 | Boariu et al. | 455/562.1 |
| 2005/0088959 A1 | 4/2005 | Kadous | |
| 2005/0141407 A1 * | 6/2005 | Sandhu | 370/203 |

(Continued)

FOREIGN PATENT DOCUMENTS

| | | |
|---|---|---|
| EP | 2 019 496 A1 | 1/2009 |
| WO | 2006 069397 | 6/2006 |
| WO | 2006 096880 | 9/2006 |
| WO | 2008 089369 | 7/2008 |

OTHER PUBLICATIONS

U.S. Appl. No. 13/502,774, filed Jun. 11, 2012, Schwager, et al.

(Continued)

*Primary Examiner* — Santiago Garcia
(74) *Attorney, Agent, or Firm* — Oblon, Spivak, McClelland, Maier & Neustadt, L.L.P.

(57) ABSTRACT

A device for bit-demultiplexing in a multicarrier MIMO communication system (e.g. precoded spatial multiplexing MIMO communication systems using adaptive OFDM), including a multicarrier MIMO transmitter and a multicarrier MIMO receiver. The multicarrier MIMO transmitter includes a demultiplexer and symbol mapper unit receiving an input bit stream and generating a plurality of symbol streams, each symbol stream being associated with a different transmission channel and including a plurality of data symbols, each data symbol being attributed to a different carrier; one or more multicarrier modulators generating at least two multicarrier modulated signals based on the symbol streams; and at least two transmit ports respectively transmitting the at least two multicarrier modulated signals, wherein a data throughput rate of each transmission channel is separately variable.

13 Claims, 4 Drawing Sheets

(56) References Cited

U.S. PATENT DOCUMENTS

| | | | |
|---|---|---|---|
| 2006/0013250 A1* | 1/2006 | Howard et al. | 370/465 |
| 2006/0039409 A1* | 2/2006 | Lampinen | 370/474 |
| 2006/0203897 A1 | 9/2006 | Kodama et al. | |
| 2006/0203935 A1 | 9/2006 | Li et al. | |
| 2006/0291371 A1* | 12/2006 | Sutivong et al. | 370/208 |
| 2007/0140364 A1 | 6/2007 | Ouyang et al. | |
| 2008/0186935 A1 | 8/2008 | Ling et al. | |
| 2008/0198902 A1 | 8/2008 | Malladi et al. | |
| 2008/0267122 A1* | 10/2008 | Han et al. | 370/329 |
| 2009/0067543 A1* | 3/2009 | Hsiao et al. | 375/298 |
| 2009/0135932 A1 | 5/2009 | Kodama et al. | |
| 2009/0231990 A1* | 9/2009 | Lee et al. | 370/207 |
| 2010/0074301 A1* | 3/2010 | Howard et al. | 375/130 |
| 2010/0195668 A1 | 8/2010 | Robert et al. | |
| 2010/0254354 A1* | 10/2010 | Sutivong et al. | 370/334 |
| 2010/0290561 A1* | 11/2010 | Ko et al. | 375/298 |
| 2010/0322322 A1 | 12/2010 | Kodama et al. | |
| 2013/0003760 A1* | 1/2013 | Schwager et al. | 370/537 |

OTHER PUBLICATIONS

European Search Report Issued Nov. 2, 2009 in French Patent Application No. 09156480.7 filed Mar. 27, 2009.

International Search Report Issued Jul. 2, 2010 in PCT/EP10/050882 filed Jan. 27, 2010.

Office Action issued May 23, 2012 in Mexican Application No. 46391.

Extended European Search Report issued Oct. 5, 2012 in Patent Application No. 12006181.7.

European Office Action issued Mar. 21, 2013, in Application No. 09 156 480.7-1851.

Combined Chinese Office Action and Search Report issued Oct. 23, 2013 in Patent Application No. 201080014093.3 with English Translation.

* cited by examiner

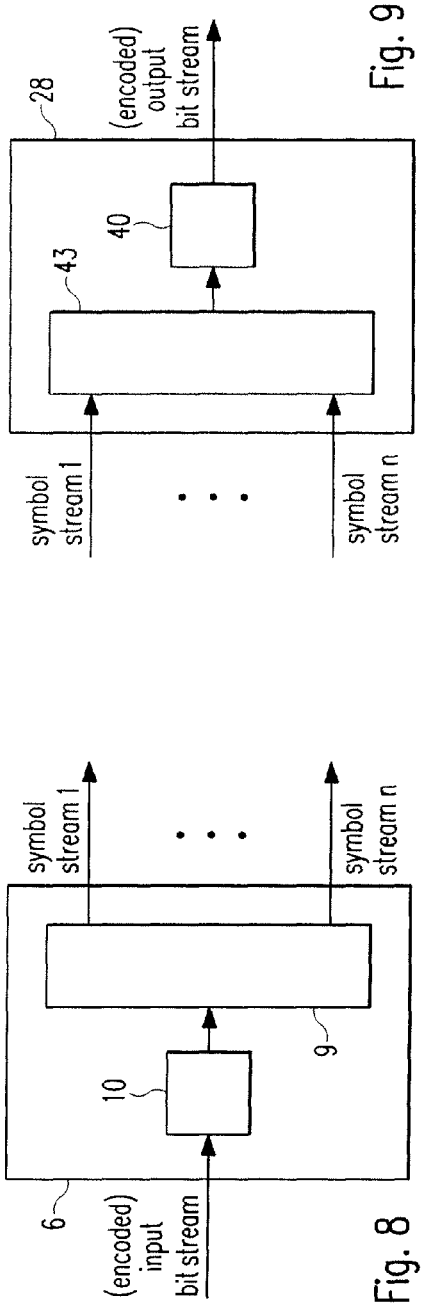

DIVISION OF BIT STREAMS TO PRODUCE SPATIAL PATHS FOR MULTICARRIER TRANSMISSION

FIELD OF THE INVENTION

The present invention relates to the field of bit-de-/multiplexing in multicarrier MIMO communication systems (e.g. precoded spatial multiplexing MIMO communication systems using adaptive OFDM). The present invention especially relates to a multicarrier MIMO transmitter and a multicarrier MIMO receiver.

DESCRIPTION OF THE PRIOR ART

MIMO (multiple input multiple output) communication systems are well known in the art. A MIMO transmitter comprises at least two transmit ports (e.g. antennas) and MIMO receiver comprises at least two receive ports (e.g. antennas). Signals are transmitted from the transmit ports to the receive ports via a communication channel which generally mixes the signals transmitted by a plurality of transmit ports. The MIMO receiver comprises a MIMO detector (MIMO decoder) which "demixes" the received signals and obtains the information comprised in the signals transmitted by the MIMO transmitter. Various kinds of MIMO transmitters are known, e.g. space-time encoded MIMO transmitters, and spatial multiplexing MIMO transmitters with precoding (e.g. eigenbeamforming MIMO transmitters) and without precoding. For each type of MIMO transmitter, a corresponding MIMO receiver is employed. MIMO technology achieves a higher spectral efficiency and higher link reliability. Also, multicarrier modulation schemes like, for example, OFDM (orthogonal frequency division multiplexing) and multicarrier wavelet modulation are well known. MIMO systems have two or more transmission channels. Usually an application has one data source and one data sink. Therefore, the data to be transmitted have to be split (demultiplexed, demuxed) to various transmission channels. At the receiver, the split data received on individual transmission channels need to be combined (multiplexed, muxed) again. This task is called bit-de-/multiplexing for the individual transmission channels. PLC (power line communication or power line carrier) communication systems transmit data using one or more conductors that are regularly used for electric power transmission. Wireless multicarrier MIMO systems use a constant symbol mapping (e.g. QAM mapping) for all carriers. This results in a constant throughput on the individual channels, so the demultiplexing at the transmitter is a static split of the incoming bits to the outgoing bits. At the receiver, the bits will be muxed in a static way again.

It is the object of the present invention to provide for improved multicarrier MIMO transmitters and receivers, especially to provide for an improved robustness of data transmission and/or reduced complexity of data transmission.

BRIEF DESCRIPTION OF THE PRESENT INVENTION

A multicarrier MIMO transmitter according to the present invention comprises a demultiplexer and symbol mapper unit for receiving an input bit stream and generating a plurality of symbol streams, each symbol stream being associated with a different transmission channel and comprising a plurality of data symbols, each data symbol being attributed to a different carrier; one or more multicarrier modulators for generating at least two multicarrier modulated signals based on the symbol streams; and at least two transmit ports for respectively transmitting the at least two multicarrier modulated signals, wherein a data throughput rate of each transmission channel is separately variable.

Because the data throughput rate of each transmission channel is separately varied, the data throughput rate can be adapted e.g. according to channel conditions, which provides for a more robust and more efficient data transmission.

Advantageously, at least one data symbol represents a non-continuous arrangement of bits from the input bit stream.

Advantageously, the demultiplexer and symbol mapper unit is adapted to split the input bit stream into a plurality of split bit streams and to generate each of said symbol streams based on a different one of said split bit streams.

Advantageously, each transmission channel has allocated a number of bits representing the data throughput rate of the respective transmission channel and said splitting of the input bit stream into the plurality of split bit streams is based on the number of bits allocated to the transmission channels and/or is based on one or more ratios of the number of bits allocated to the transmission channels.

Advantageously, the bits of the split bit streams are evenly distributed within the input bit stream. Of course, this is not a property of the input bit stream but a property of the employed multiplexing. In other words, each split bit stream is seen as a group of bits and the different groups of bits are evenly distributed in the input bit stream. In still other words, each split bit stream is seen as a group of bits and said splitting of the input bit stream into the split bit streams is performed in a way that the members of the groups of bits are evenly distributed in the input bit stream. In still other words, each bit of the input bit stream is seen as corresponding to a class, the respective class being given by the split bit stream of which the bit is part of, and the classes are evenly distributed in the input bit stream.

Advantageously, the input stream comprises at least two sections, each section comprising at least two groups of bits, each group of the at least two groups being demultiplexed to another one of the split bit streams and being given by one or more consecutive bits.

Alternatively, each data symbol advantageously represents a continuous sequence of bits from the input bit stream.

Advantageously, demultiplexer and symbol mapper unit is adapted to map the bits of the input data bit stream to the data symbols and demultiplex the data symbols to the plurality of symbol streams.

Advantageously, a group of all data symbols of a symbol stream represents a continuous sequence of bits from the input bit stream; or a group of all data symbols of corresponding subcarriers of the transmission channels represents a continuous sequence of bits from the input bit stream; or each of the continuous sequences of bits of the input bit stream is transmitted on a specific subcarrier of a specific transmission channel defined by a pseudo random sequence.

Advantageously, the demultiplexer and symbol mapper unit is adapted to sequentially map the continuous bit sequences to data symbols.

Advantageously, a constellation used in the generation of data symbols is adapted for at least some subcarriers on at least some transmission channels.

A multicarrier MIMO receiver according to the present invention comprises at least two receive ports for respectively receiving at least two multicarrier modulated signals; one or more multicarrier demodulators for demodulating the received at least two signals, a detector for generating at least two symbol streams based on the demodulated at least two signals, each symbol stream being associated with a different transmission channel and comprising a plurality of data symbols; and a symbol demapper and multiplexer unit for generating an output bit stream based on the at least two symbol streams.

Advantageously, at least one data symbol represents a non-continuous arrangement of bits of the output bit stream.

Advantageously, the symbol demapper and multiplexer unit is adapted to demap the plurality of symbol streams into a corresponding plurality of split bit streams.

Advantageously, wherein each transmission channel has allocated a number of bits indicating the data throughput rate of the respective transmission channel and the symbol demapper and multiplexer unit is adapted to multiplex said split bit streams into said output bit stream based on the number of bits allocated to the transmission channels and/or based on one or more ratios of the number of bits allocated to the transmission channels.

Advantageously, bits of the split bit streams are evenly distributed within the output bit stream.

Advantageously, wherein the output bit stream comprises at least two sections, each section comprising at least two groups of bits, each group of the at least two groups being given by one or more consecutive bits and being multiplexed into the output bit stream from another one of the split bit streams.

Alternatively, each data symbol advantageously represents a continuous sequence of bits from the output bit stream.

Advantageously, the symbol demapper and multiplexer unit is adapted to multiplex the data symbols of the plurality of symbol streams into a single symbol stream and demap the multiplexed data symbols into the output bit stream.

Advantageously, a group of all data symbols of one of the plurality of symbol streams represents a continuous sequence of bits from the output bit stream; or a group of all data symbols of corresponding subcarriers of the transmission channels represents a continuous sequence of the output bit stream; or each of the continuous sequences of bits of the output bit stream is received on a specific subcarrier of a specific transmission channel defined by a pseudo random sequence.

Advantageously, the symbol demapper and multiplexer unit is adapted to sequentially demap the data symbols to the continuous bit sequences.

Advantageously, a constellation used in the generation of the output bit stream based on the at least two symbol streams is adapted for at least some subcarriers on at least some transmission channels.

BRIEF DESCRIPTION OF THE DRAWINGS

FIG. 6 shows a first example of the bit-de-/multiplexing obtained using the algorithm.

FIG. 7 shows a second example of the bit-de-/multiplexing obtained using the algorithm.

FIG. 8 shows a schematic representation of a second alternative embodiment of the demultiplexer and symbol mapper unit.

FIG. 9 shows a schematic representation of a second alternative embodiment of the symbol demapper und multiplexer unit.

DESCRIPTION OF THE PREFERRED EMBODIMENTS

Figure 1:
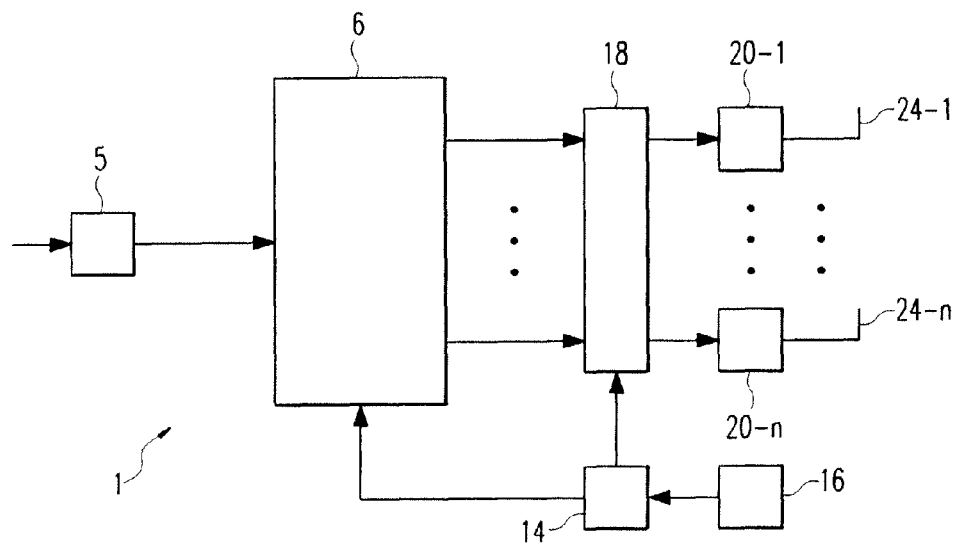
FIG. 1 shows a schematic representation of an embodiment of the transmitter according to the present invention.
Figure 2:
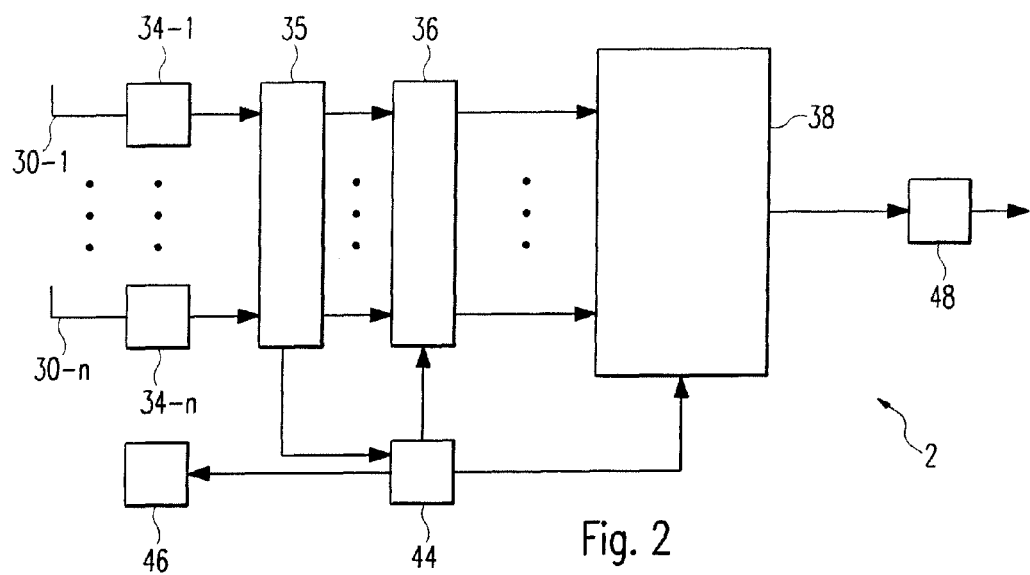
FIG. 2 shows schematic representation of an embodiment of the receiver according to the present invention.

FIG. 1 and FIG. 2 show a first embodiment of the multicarrier MIMO transmitter 1 and the multicarrier MIMO receiver 2 of the present invention. The transmitter 1 and the receiver 2 may be (or may be comprised in) any kind of communication devices like, as non limiting examples, mobile phones, personal computers, televisions, audio and/or video recording and/or playback devices and PLC modems.

According to the present invention, the transmitter 1 comprises a demultiplexer and symbol mapper unit 6, one or more multicarrier modulators 20-1 to 20-n and at least two transmit ports 24-1 to 24-n.

The transmitter 1 of this embodiment further comprises an encoder 5 which encodes an input bit stream according to an error correction code and/or error detection code. As is known in the art, error correction codes are used for forward error correction. Both the encoded and the unencoded input bit stream will be called input bit stream in the following.

Figure 3:
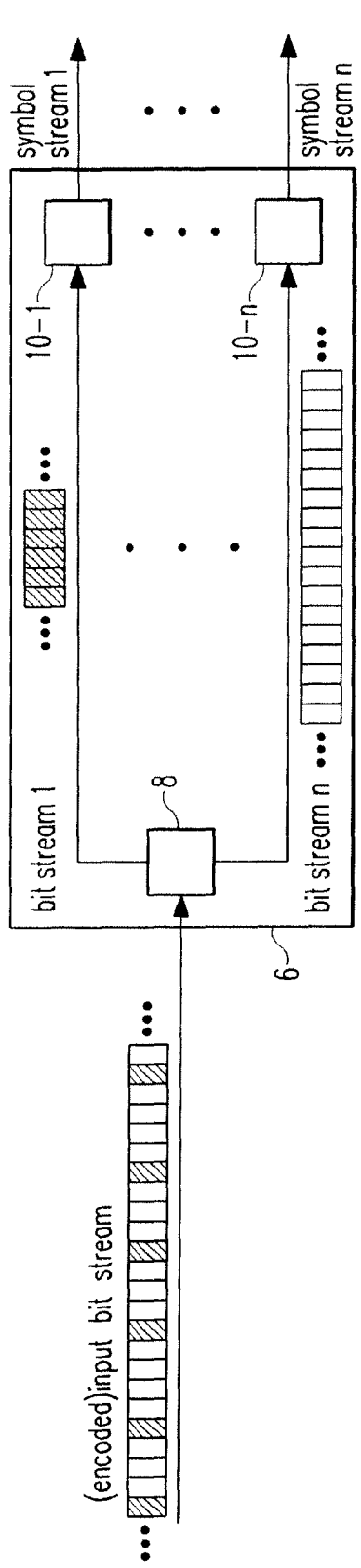
FIG. 3 shows a schematic representation of a first alternative embodiment of the demultiplexer and symbol mapper unit.

The (encoded) input bit stream is then further processed by the demultiplexer and symbol mapper unit 6. The demultiplexer and symbol mapper unit 6 maps the bits to data symbols by one or more symbol mappers (e.g. OFDM modulators) 10, 10-1 to 10-n as shown in FIG. 3 or FIG. 8. Hereby, the demultiplexer and symbol mapper unit 6 generates a plurality of symbol streams. Each symbol stream comprises a plurality of data symbols, each data symbol being attributed to (transmitted on) a different subcarrier. Each one of the symbol streams corresponds to a different MIMO transmission channel. The MIMO transmission channels may also be called MIMO paths. The number of MIMO transmission channels is typically the same as the number of transmit ports 24-1 to 24-n but may also be smaller than the number of transmit ports 24-1 to 24-n. The mapping of bits to data symbols is performed according to constellations set for each subcarrier on each transmission channel. The constellations are varied according to channel conditions (adaptive multicarrier modulation). For example, the constellation of a subcarrier of a transmission channel may be selected according to a channel quality measure (e.g. signal-to-noise ratio, SNR) determined for this subcarrier on this transmission channel. The constellations may be selected for each subcarrier on each transmission channel separately. For example noise, frequency dependent attenuation, changes in the MIMO channel (e.g. by switching a light on/off in a PLC channel) can influence or change the selection of a constellation and thereby influence or change the number or ratio (proportion) of bits allocated to the transmission channels. Constellation information indicating the constellations to employ by the one or more symbol mappers may, for example, be stored in a memory 14 of the transmitter 1. The constellation information is sometimes called tone map (e.g. OFDM tone map). Adaptive multicarrier modulation is especially advantageous in case of PLC communication systems. The data throughput varies with the (size of the) constellation. The size of a constellation is the amount of information (e.g. the number of bits) that is comprised in data symbol obtained according to the constellation. The size of the constellation is therefore the amount of information (e.g. number of bits) that is transmitted on the subcarrier of the transmission channel. Thus, the present invention provides bit-de-/multiplexing with a variable throughput rate. The throughput rate of each transmission channel varies separately. The demultiplexing of the data to the transmission channels may be performed on bit level or on data symbol level as will be described below in more detail.

The symbol streams are then MIMO precoded by a precoder 18. The precoding employed for example may be an eigenbeamforming precoding. However, any suitable MIMO precoding might be employed. For example, precoding according to a space-time code (e.g. Alamouti code) might be employed. The precoder might also be omitted. In the case where the precoder is omitted, the transmission channels correspond to the transmit ports, that is, each symbol stream is transmitted by another one of the transmit ports 24-1 to 24-n. On the other hand, when for example eigenbeamforming is employed, the transmission channels do not correspond to the transmit ports 24-1 to 24-n. This is because Eigenbeamforming "mixes" the input symbol stream to generate the precoded (output) symbol streams. The precoder 18 generates a plurality of precoded data symbol streams according to the number of transmit ports 24-1 to 24-n.

Each precoded data symbol stream is then multicarrier modulated (e.g. OFDM modulated, multicarrier wavelet modulated) by a corresponding multicarrier modulator (e.g. OFDM modulator) 20-1 to 20-n and transmitted by a corresponding one of the transmit ports 24-1 to 24-n. Alternatively, a single multicarrier modulator sequentially modulates the precoded data symbols. In this case, the modulated data symbol streams are then demultiplexed to the respective transmit ports 24-1 to 24-n.

The transmit ports 24-1 to 24-n might for example be antennas. In one embodiment however, the transmit ports 24-1 to 24-n are adapted to transmit signals to the receiver 2 via two or more conductors. Hereby, the conductors may be dedicated data transition lines or may—additionally or primarily—serve the purpose of transmitting electrical power (e.g. PLC transmitter transmitting on mains power lines).

The receiver 2 receives the signals transmitted on the MIMO channel (not shown) by the transmitter 1 with its at least two receive ports 30-1 to 30-n. The signals comprise the information of the input bit stream. The receive ports 30-1 to 30-n may for example be antennas. In one embodiment however, the receive ports 30-1 to 30-n are adapted to receive the signals via two or more conductors. The conductors may hereby be dedicated to data transmission or may—additionally or primarily—serve the purpose of electric power transmission (e.g. PLC receiver receiving on mains power lines).

The at least two multicarrier modulated signals are then demodulated by respective at least two multicarrier demodulators (e.g. OFDM demodulators, multicarrier wavelet demodulators) 34-1 to 34-n. The demodulation may also be done sequentially, as 20-1 to 20-n in transmitter 1. Instead of a plurality of multicarrier demodulators according to the number of receive ports 30-1 to 30-n, also less multicarrier demodulators, e.g. a single multicarrier demodulator, might be employed. In this case, the received multicarrier modulated signals are, at least partially, demodulated in sequence.

A channel estimator 35 obtains channel state information (CSI) based on the demodulated signals. The CSI might for example comprise a channel matrix and a channel quality measure (e.g. signal-to-noise ratio) for each subcarrier on each transmission channel. Determination of channel state information might for example be based on training symbols and/or pilot symbols. As described above, the constellations used in the symbol mapping and demapping are adapted to channel conditions. The specific constellations to employ may be determined based on the channel state information. For example, the constellation for a specific subcarrier on a specific transmission channel might be determined based on the channel quality measure (e.g. signal-to-noise ratio) of the specific subcarrier of the specific transmission channel. The CSI and the constellation information might, for example, be stored in a memory 44 of the receiver 2. Thus, the present invention provides bit-de-/multiplexing with a variable throughput rate.

A detector 36 performs a MIMO detection (MIMO decoding) on the demodulated signals. The detection may be based on CSI obtained by the channel estimator 35. Any kind of detectors (decoders) might be employed. For example, zero forcing (ZF), minimum mean square error (MMSE) and maximum likelihood (ML) detectors might be employed. As a result of the MIMO detection, at least two symbol streams corresponding to the at least two transmission channels are obtained.

Figure 4:
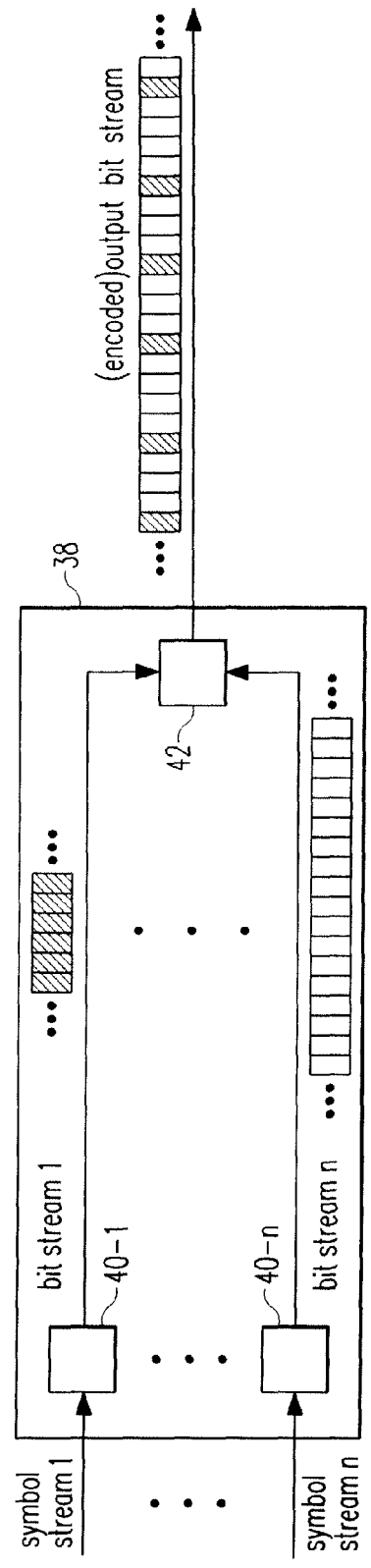
FIG. 4 shows a schematic representation of a first alternative embodiment of the symbol demapper und multiplexer unit.

In the symbol demapper and multiplexer unit 38, the detected symbol streams are processed reversing the processing of the demultiplexer and symbol mapper unit 6 of the transmitter 1 in order to obtain an output bit stream. Especially, each data symbol comprised in the symbol streams is mapped ("demapped") to a number of bits represented by the data symbol by one or more symbol demappers 40, 40-1 to 40-n as shown in FIG. 4 or FIG. 9. As described above, adaptive multicarrier demodulation might be employed. The constellation information indicating the constellations to use might for example be stored in a memory 44 of the receiver 2. The multiplexing of the data received on the plurality of transmission channels into the output bit stream may be performed on bit level or on data symbol level as will be described below in more detail. The output bit stream is still encoded with the encoding applied by the encoder 5 of the transmitter 1.

The encoded output bit stream is decoded by a decoder 48 by an error correction and/or detection method corresponding to the error correction and/or detection code employed by the encoder 5. As a result, a decoded output bit stream is obtained. The encoded and the decoded output bit stream will in the following both be referred to as output bit stream.

The receiver 2 may further comprise a transmitting section 46 and the transmitter 1 may further comprise a receiving section 16. By means of the transmitting section 46 and the receiving section 16 a back channel is provided, by which any kind of information can be transmitted from the receiver 2 to the transmitter 1. The transmitting section 46 may, but need not, have the structure and the functionality of the transmitter 1. Using the transmitting section 46, the receiver 2 may, for example transmit channel state information, precoding information and constellation information (e.g. OFDM tonemap), that is, information indicating the constellations to use in the mapping of bits to data symbols for each subcarrier on each transmission channel. The receiving section 16 may, but need not, have the structure and the functionality of the receiver 2. Using the receiving section, the transmitter 1 may, for example, receive the channel state information, precoding information and the constellation information generated and transmitted by the receiver 2.

Now, two alternative embodiments of the transmitter 1 and the receiver 2 will be described. In the first alternative embodiment, bit-de-/multiplexing is performed on the bit level. In the second alternative embodiment, bit-de-/multiplexing is performed on the symbol level. Both the first and the second alternative embodiments have the structure and operation as described above in relation to FIGS. 1 and 2.

FIGS. 3 and 4 show the demultiplexer and symbol mapper unit 6 of the transmitter 1 and the symbol demapper and multiplexer unit 38 of the receiver 2 according to the first alternative embodiment.

In the first alternative embodiment, the demultiplexer and symbol mapper unit 6 comprises a demultiplexer 8 operating on the bit level and a plurality of symbol mappers (e.g. QAM modulators) 10-1 to 10-n, each symbol mapper corresponding to a different MIMO transmission channel. The demultiplexer 8 demultiplexes the input bit stream into a number of split bit streams. The split bit streams are processed in parallel and the input bit stream is clocked or, at least, is clockable at a higher rate than any of the split bit streams. The number of split bit streams is at least two and is given by the number of MIMO transmission channels. Each split bit stream corresponds to a different one of the transmission channels. The bits are represented by small rectangles. Bits represented by a diagonally striped rectangles are demuxed to the first transmission channel. Bits represented by unfilled rectangles are demuxed to the n-th transmission channel. It is noted that the depicted section of the input bit stream does not comprise bits demuxed to other transmission channels than the first transmission channel and the n-th transmission channel. This is for purpose of illustration only and should not be construed as limiting. Generally there will be bits demuxed to transmission channels other than the first transmission channel and the n-th transmission channel interspersed in the input bit stream. Each split bit stream is then mapped to a corresponding symbol stream by a corresponding symbol mapper 10-1 to 10-n. Thus, the various split bit streams are processed (mapped) in parallel. As described above, variable constellations (adaptive multicarrier modulation) are employed. Advantageously, an equal distributed bit-demultiplexing is employed, which guarantees a balanced distribution of the bits to the two or more bit streams. This will be described in more detail below.

Similarly, the symbol demapper and multiplexer unit 38 of the first alternative embodiment comprises a number of symbol demappers 40-1 to 40-n according to the number of transmission channels (symbol streams) and a multiplexer 42 operating on the bit level. The plurality of symbol streams feed into the symbol demapper and multiplexer unit 38 are processed in parallel. Each one of the symbol demappers 40-1 to 40-n maps ("demaps") the data symbols of a different one of the symbol streams to a corresponding split bit stream. The split bit streams obtained by demapping the symbol streams are then multiplexed into a single bit stream, which is the output bit stream, by the multiplexer 42. The output bit stream is clocked or, at least, is clockable at higher rate than any of the split bit streams.

Figure 5:
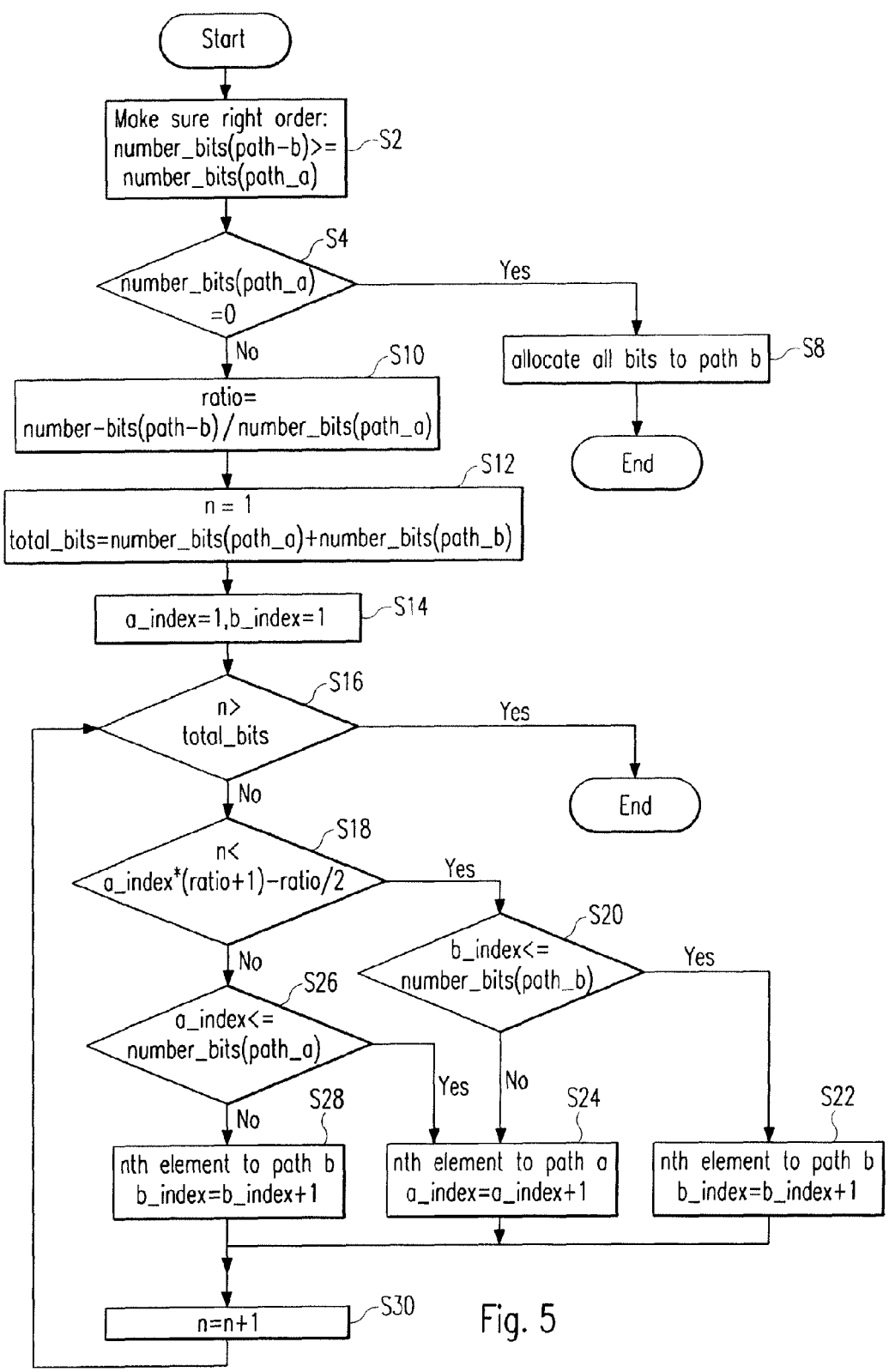
FIG. 5 shows a flow diagram of a bit-de-/multiplexing algorithm according to the first alternative embodiment.

A specific embodiment of the bit level bit-de-/multiplexing applied in the transmitter 1 and the receiver 2 of the first alternative embodiment is now explained with reference to FIG. 5. The algorithm is performed once for each multicarrier symbol (e.g. OFDM symbol) or is performed at least each time a constellation size used in the symbol mapping/demapping changes. The algorithm operates bit-wise. In the transmitter 1, the algorithm determines which bit of the (encoded) input bit stream is to be transmitted on which transmission channel (and, implicitly, on which subcarrier), so that the split bit streams can be properly demultiplexed from the input bit stream. In the receiver 2, the algorithm determines which bit of the (encoded) output bit stream has been transmitted on which transmission channel (and, implicitly, on which subcarrier), so that the split bit streams can be properly multiplexed into the output bit stream. In the embodiment, the number of transmission channels is assumed to be two. Some of the actions performed according to the algorithm as described below relate to the transmitter 1 only. The skilled person will however recognize what corresponding actions have to be performed in the receiver 2.

In step S2 the number of bits allocated to (transmitted by) the transmission channels are determined. The transmission channel with the higher number of bits allocated is set path_b and the transmission channel with the lower number of bits allocated is set path_a.

In step S4 it is determined if the number of bits allocated to the transmission channel path_a is zero. If yes, a number of consecutive bits from the input bit stream, which is given by the number of bits allocated to path_b is allocated to path_b in step S8. If no, the process proceeds to step S10.

In step S10 the ratio of the bits allocated to the transmission channel path_b and transmission channel path_a is determined.

In steps S12 and S14 the number of bits transmitted the plurality of transmission channels is obtained and variables n, a_index and b_index are set to one.

In step S16 it is determined if the variable n is larger than the total number of bits allocated to the plurality of transmission channels. If yes, all bits have been allocated for the multicarrier symbol and the algorithm is finished. If no, the algorithm proceeds to step S18.

In step S18 the inequality $$n < a\_index * (ratio+1) - ratio/2 \quad (1)$$

is evaluated. The second term "ratio/2" might be omitted or replaced by another constant. Constant here means independent of the variable n and not variable during the algorithm. In case the inequality holds, the algorithm proceeds to step S20. In case the inequality does not hold, the algorithm proceeds to step S26.

In step S20 it is determined if there are still unallocated bits on transmission channel path_b. If yes, the n-th bit of the input bit stream is allocated to transmission channel path_b and the variable b_index is augmented by one in step S22 and the algorithm proceeds to step S30. If no, the algorithm proceeds to step S24.

In step S24 the n-th bit of the input bit stream is allocated to transmission channel path_a and the variable a_index is augmented by one and the algorithm proceeds to step S30.

In step S26 it is determined if there are still unallocated bits on transmission channel path_a. If yes, the n-th bit of the input bit stream is allocated to transmission channel path_a and the variable a_index is augmented by one in step S24 and the algorithm proceeds to step S30. If no, the algorithm proceeds to step S28.

In step S28 the n-th bit of the input bit stream is allocated to transmission channel path_b and the variable b_index is augmented by one. And the algorithm proceeds to step S30.

In step S30 the variable n is augmented by one and the algorithm returns to step S16.

Thus, the description of the algorithm as operated by the transmitter 1 is finished. When executed in the receiver 2, the steps S4, S22 and S24 and S28 take on the following form:

In step S4, it is determined if the number of bits allocated to the transmission channel path_a is zero. If yes, the output bit stream is given by the bit stream received on transmission channel path_b. If no, the process proceeds to step S10.

In step S22, the n-th bit of the output bit stream is taken from transmission channel path_b (n-th bit of the output bit stream is given by the next unallocated bit of transmission channel path_b), the variable b_index is augmented by one and the algorithm proceeds to step S30.

In step S24, the n-th bit of the output bit stream is taken from transmission channel path_a (n-th bit of the output bit stream is given by the next unallocated bit of transmission channel path_a), the variable a_index is augmented by one and the algorithm proceeds to step S30.

In step S28, the n-th bit of the output bit stream is taken from transmission channel path_b (n-th bit of the output bit stream is given by the next unallocated bit of transmission channel path_b), the variable b_index is augmented by one and the algorithm proceeds to step S30.

It is clear that, steps which are identical for the transmitter 1 and the receiver 2 need not be performed twice. Results and intermediate data may be shared (transmitted) between the transmitter 1 and the receiver 2 so as to reduce the complexity of computation.

Examples of the bit-de-/multiplexing obtained by this algorithm are depicted in FIGS. 6 and 7.

FIG. 6 shows the input/output bit stream, the split bit stream corresponding to transmission channel path_b, the split bit stream corresponding to transmission channel path_a and the input/output bitstream represented by the bits of the split bit streams in the case where the ratio of bits allocated to transmission channel path_b and transmission channel path_a is three (i.e. ratio=3). The input bit stream is given by a sequence of bits N1, N2, N3, . . . . The split bit stream corresponding to a transmission channel path_a is given by a sequence of bits A1, A2, A3, . . . . The split bit stream corresponding to a transmission channel path_b is given by a sequence of bits B1, B2, B3, . . . . The first, the second and the third bit B1, B2 and B3 of the split bit stream of path_b are given by the first, the second and the fourth bit N1, N2 and N4 of the input bit stream. Correspondingly, the first four bits N1 to N4 of the output bit stream are given by the bits B1, B2, A1 and B3, respectively. The pattern of allocation BBAB (equivalently BABB, ABBB) repeats every four bits. In an example where the first subcarrier of path_b is 16-QAM modulated, bits N1,N2, N4 and N5 are mapped to a 16-QAM modulated data symbol ("first data symbol"). Since the bit N3 is not part of the bits represented by the first data symbol, the first data symbol represents a non-continuous arrangement (non continuous sequence) of bits of the input/output bit stream. In an example where the first subcarrier of path_a is QPSK modulated, bits N3 and N7 are mapped to a QPSK modulated symbol ("second data symbol"). Since the bits N4 to N6 are not part of the bits represented by the second data symbol, the second data symbol represents a non-continuous arrangement (non-continuous sequence) of bits from the input/output bit stream. Of course, the split bit streams are processed (e.g. mapped) in parallel as described above. FIG. 5 shall NOT be understood as if there were a ordering (e.g. time ordering) BETWEEN the bits of the different transmission channels (e.g. it is NOT implied that the bit B2 is mapped to a data symbol before the bit A1 is mapped to a data symbol). The horizontal direction of FIG. 5 solely represents the order WITHIN the respective streams.

FIG. 7 shows the same bit streams with the same representations as FIG. 6 in the case where the ratio of allocation is 3/2. In this case it can be seen that the pattern of allocation BABBA (equivalently ABBAB, BBABA, BABAB, ABABB) is repeated every five bits.

As can be seen from FIGS. 6 and 7, when the input/output bit stream is represented by the bits of the split bit streams of transmission channel path_b and path_a, the bits of the split bit streams are evenly spread (evenly distributed, uniformly distributed) within the input/output bit stream. No undue accumulation of the bits of a given split bit stream occurs in the input/output bit stream. Thus, consecutive bits of the input/output bit stream are maximally spread to the transmission channels. This improves the reliability of data transmission and provides advantageous conditions for successful operation of the (forward) error correcting and/or error detecting code. This is because the number of burst errors and/or the length of burst errors in the received encoded bit stream is reduced.

As can be seen, the input/output bit stream, when represented by the bits of the split bit streams, is of a structure comprising at least two sections (e.g. A1B3B4B5 and A2B6B7B8 in the case of ratio=3 or B1A1 and B2B3A2 in the case of ratio=3/2), each section comprising at least two groups of bits, each group of the at least two groups of bits being demultiplexed to another one of the split bit streams (e.g. A1 multiplexed to path_a, B3B4B5 multiplexed to path B in the case of ratio=3 or B1 multiplexed to path_b and A1 multiplexed to path_a). The number of the groups, as in these examples, advantageously is the same as the number of transmission channels.

As can be seen, the input/output bit stream, when represented by the bits of the split bit streams, is of a structure comprising at least two sections (e.g. B1B2A1B3 and B4B5A2B6 in the case of ratio=3 or B1A1B2B3A2 and B4A3B5B6A4 in the case of ratio=3/2), whereby each section comprises bits of split bit streams in the same ratio (proportion) as the ratio (proportion) of the bits of the split bit streams comprised the input/output bit stream. While the algorithm generally produces such a structure, there exist ratios of allocation where such structure is not feasible due to mathematical impossibility. In this case the algorithm produces only one section that comprises the bits of the split bit streams in the same ratio as the input/output bit stream. This one structure is the input/output stream itself.

FIGS. 8 and 9 show the demultiplexer and symbol mapper unit 6 of the transmitter 1 and the symbol demapper and multiplexer unit 38 of the receiver 2 according to the second alternative embodiment in which the bit-de-/multiplexing is performed on symbol level.

When operating on the data symbol level, the complexity of demultiplexing and multiplexing can be greatly reduced. To achieve this, a symbol mapper 10 (e.g. QAM modulator) is provided which has a throughput that is sufficient for all transmission channels in sum so that it sequentially maps the bits of the input data stream to data symbols for all subcarriers on all transmission paths. The obtained data symbols are then demultiplexed by a demultiplexer 9 to the at least two transmission channels.

In some embodiments a feedback control signal from the symbol mapper 10 to the encoder 5 might be provided to adjust the data throughput (e.g. the symbol mapper requests the necessary number of bits from the encoder 5).

The symbol mapper 10 may map the subcarriers of the different transmission channels in a block-wise way, a sequential way or a pseudorandom way for example.

In the block-wise way, the symbol mapper 10 first maps all subcarriers of the first transmission channel then maps all subcarriers of the second transmission channel, then maps all subcarriers of the third transmission channel and so on until all subcarriers of all transmission channels have been mapped (e.g. QAM modulated).

In the sequential way, the symbol mapper 10 first maps the first subcarriers for all paths, then maps the second subcarriers for all paths, then maps the third subcarriers for all paths and so on until all subcarriers of all paths are mapped (e.g. QAM modulated).

It is understood that subcarriers are normally ordered according to a physical characteristic (e.g. frequency of OFDM subcarrier, bandwidth of carrier wavelet). This natural order is the order in which the subcarriers are mapped in the block-wise way and the sequential way. Of course each subcarrier is represented once on each transmission channel and there is a block-wise and a sequential natural order of the combinations of the subcarriers with the transmission channels. In the block-wise natural order, the combinations of subcarriers with transmission channels are first grouped according to transmission channels and then, within each group, according to the subcarrier natural order. In the sequential natural order, the combinations of subcarriers with transmission channels are first grouped according to the natural order of subcarriers and then, within each group, according to transmission channels.

In the pseudorandom way, the symbol mapper 10 maps (e.g. QAM modulates) the subcarriers of all transmission channels according to a pseudorandom sequence. When the number of transmission channels is t and the number of subcarriers is c, the length of the sequence is t*c. With each subcarrier of each transmission channel there is associated a digit of the pseudorandom sequence. The k-th digit of the random sequence indicates which subcarrier and transmission channel combination according to the natural order will be mapped at the k-th step. In other words, the pseudorandom sequence will be read sequentially, $1^{st}$, $2^{nd}$ ... k-th ... until (t*c)-th and at the same time the incoming bit-stream will be allocated to the subcarrier with the index defined by the pseudorandom sequence. When the k-th digit of the sequence is j, the current bits will be mapped to the j-th combination of subcarrier and transmission channel according to the natural order. For example, when j=1, the current bits of the input bit stream will be transmitted on the j-th subcarrier and transmission channel combination. The pseudorandom sequence can for example be saved in the memory 14. The demultiplexer and symbol mapper unit 6 may then read the sequence from the memory 14 and perform the corresponding reordering (carrier index reordering). In some embodiments, the demultiplexer and symbol mapper unit 6 and the precoder 18 may perform the reordering collaboratively. In this case, the precoder 18 operates based on pseudorandom sequence. For notched carriers (i.e. carriers on which no information is transmitted e.g. because the channel conditions are bad), the reordering remains uninfluenced because the notch information is already included in the constellation information.

Again, the symbol demapper and multiplexer unit 38 of the receiver 2 performs the necessary operations to restore the original bit sequence (i.e. reverses the operation of the demultiplexer and symbol mapper unit 6 of the transmitter 1). To this effect, the symbol demapper and multiplexer unit 38 may for example comprise a multiplexer 43 operating on the symbol level and a single symbol demapper 40 as is depicted in FIG. 9. The multiplexer 43 multiplexes the symbols received on the at least two transmission channels into a single symbol stream and provides it to the symbol demapper 40. The symbol demapper (e.g. QAM demodulator) 40 has a throughput that is sufficient for all transmission channels in sum and generates the output bit stream by sequentially demapping (e.g. QAM demodulating) all subcarriers on all transmission channels. The symbol demapper and multiplexer unit 38 may for example operate according to the principles of the block-wise way, the sequential way and the pseudorandom way described above. In case of the pseudorandom way, the symbol demapper and multiplexer unit 38 may read the pseudorandom sequence stored in memory 44 and perform a corresponding reordering of the received data symbols, so that the original input bit stream can be restored. In some embodiments, the symbol demapper and multiplexer unit 38 and the MIMO decoder 35 may perform the reordering collaboratively. In this case, the decoder 35 operates based on pseudorandom sequence.

The pseudorandom sequence may be fixed or may be different for different multicarrier symbols (e.g. OFDM symbols). When the pseudorandom sequence is fixed, the corresponding ordering of the subcarrier and transmission channels can be hardcoded into the transmitter 1 and the receiver 2, which reduces complexity of the devices.

The carrier reordering according to the pseudorandom sequence improves the robustness of data transition and provides favorable conditions for successful operation of the error correction and/or detection code.

Between the demultiplexer and symbol mapper unit 6 and the precoder 18, an additional interleaver (not shown) can be provided. The interleaver might for example scramble (exchange) information between all, or at least some, subcarriers and transmission channels with identical constellations. This further increases the robustness of data transmission.

Bit-de-/multiplexing on the data symbol level reduces the complexity of the de-/multiplexer units as compared to bit-de-/multiplexing on bit level. In the most complex case of data symbol level bit-de/multiplexing, still only a carrier index reordering algorithm has to be applied as described above. Further, as was shown above, a single symbol mapper and a single symbol demapper can be employed in the case of symbol level bit-de-/multiplexing, which reduces further the complexity of the transmitter 1 and the receiver 2.

It is noted that the same transmission signals as obtained by the second alternative embodiment can also be obtained with the structure of the first alternative embodiment depicted in FIGS. 3 and 4. This is possible since the structure of the first alternative embodiment is able to perform a more fine grained (i.e. bit level) bit-de-/multiplexing than the structure of the second alternative embodiment, which performs a symbol level bit-de-/multiplexing. Thus, also the demultiplexer and symbol mapper unit with the structure of FIG. 3 and the symbol demapper and multiplexer unit with the structure of FIG. 4 might operate according to the principles of the block-wise way, the sequential way and the pseudorandom way described above. In this case however, the described benefit of reduced complexity is not fully obtained. Also, in some embodiments, feedback control signals would be required from each of the symbol mappers 10-1 to 10-*n* and the demultiplexer 8 to the encoder 5 to adjust the data throughput.

Instead of the single encoder 5 also a plurality of (error correction and/detection code) encoders, one for each transmission channel, might be provided between the demultiplexer and mapper unit 6 and the precoder 18. In this case, a plurality of (error correction and/or detection code) decoders might be provided, one decoder for each transmission channel, between the detector 36 and the multiplexer and demapper unit 38.

Instead of the single encoder 5 also a plurality of (error correction and/detection code) encoders, one for each transmission channel, might be provided between the demultiplexer 8 and the symbol mappers 10-1 to 10-*n*. In this case, a plurality of (error correction and/or detection code) decoders might be provided, one decoder for each transmission channel, between the symbol demappers 40-1 to 40-*n* and the multiplexer 42.

While having explained embodiments of the present invention, where a channel estimation is performed at the receiver side, the present invention is not limited to this and channel estimation might also be performed at the transmitter side (e.g. in case of a symmetric MIMO channel).

The invention claimed is:

1. A multicarrier MIMO transmitter comprising:
   demultiplexer and symbol mapper circuitry configured to receive an input bit stream and to generate a plurality of symbol streams, each symbol stream being associated with a different transmission channel and comprising a plurality of data symbols, each data symbol being attributed to a different carrier;
   one or more multicarrier modulators to generate at least two multicarrier modulated signals based on the symbol streams; and
   at least two power line communication (PLC) tramsmit ports, wherein each of the transmit ports is respectively configured to transmit one or more of the at least two multicarrier modulated signals via conductors included in an electric power transmission system, wherein
   a data throughput rate of each transmission channel is separately variable,
   the demultiplexer and symbol mapper circuitry is configured to split the input bit stream into a plurality of split bit streams and to generate each of the symbol streams based on a different one of the split bit streams, and
   the input stream comprises at least two sections, each section comprising at least two groups of bits, each group of the at least two groups being demultiplexed to another one of the split bit streams and being given by one or more consecutive bits.

2. The transmitter according to claim 1, wherein at least one data symbol represents a non-continuous arrangement of bits from the input bit stream.

3. The transmitter according to claim 1, wherein each transmission channel has allocated a number of bits representing the data throughput rate of the respective transmission channel and the splitting of the input bit stream into the plurality of split bit streams is based on the number of bits allocated to the transmission channels and/or is based on one or more ratios of the number of bits allocated to the transmission channels.

4. The transmitter according to claim 1, wherein the bits of the split bit streams are evenly distributed within the input bit stream.

5. The transmitter according to claim 1, wherein each data symbol represents a continuous sequence of bits from the input bit stream.

6. The transmitter according to claim 5, wherein the demultiplexer and symbol mapper circuitry is configured to map the bits of the input data bit stream to the data symbols and demultiplex the data symbols to the plurality of symbol streams.

7. The transmitter according to claim 5, wherein a group of all data symbols of a symbol stream represents a continuous sequence of bits from the input bit stream.

8. The transmitter according to claim 5, wherein a group of all data symbols of corresponding subcarriers of the transmission channels represents a continuous sequence of bits from the input bit stream.

9. The transmitter according to claim 5, wherein each of the continuous sequences of bits of the input bit stream is transmitted on a specific subcarrier of a specific transmission channel defined by a pseudo random sequence.

10. The transmitter according to claim 5, wherein the demultiplexer and symbol mapper circuitry is configured to sequentially map the continuous bit sequences to data symbols.

11. The transmitter according to claim 1, wherein a constellation used in the generation of data symbols is configured for at least some subcarriers on at least some transmission channels.

12. A method performed by a multicarrier MIMO transmitter, the method comprising:
    receiving an input bit stream;
    generating a plurality of symbol streams, each symbol stream being associated with a different transmission channel and comprising a plurality of data symbols, each data symbol being attributed to a different carrier;
    generating at least two multicarrier modulated signals based on the symbol streams; and
    transmitting, via at least two respective power line communication (PLC) transmit ports, one or more of the at least two multicarrier modulated signals over conductors included in an electric power transmission system, wherein
    a data throughput rate of each transmission channel is separately variable,
    the generating the plurality of symbol streams includes splitting the input bit stream into a plurality of split bit streams and generating each of the symbol streams based on a different one of the split bit streams, and
    the input stream comprises at least two sections, each section comprising at least two groups of bits, each group of the at least two groups being demultiplexed to another one of the split bit streams and being given by one or more consecutive bits.

13. A non-transitory computer-readable medium including computer-program instructions, which when executed by a multicarrier MIMO transmitter, cause the multicarrier MIMO transmitter to:
    receive an input bit stream;
    generate a plurality of symbol streams, each symbol stream being associated with a different transmission channel and comprising a plurality of data symbols, each data symbol being attributed to a different carrier;
    generate at least two multicarrier modulated signals based on the symbol streams; and
    transmit, via at least two respective power line communication (PLC) transmit ports, one or more of the at least two multicarrier modulated signals over conductors included in an electric power transmission system, wherein
    a data throughput rate of each transmission channel is separately variable,
    the generating the plurality of symbol streams includes splitting the input bit stream into a plurality of split bit streams and generating each of the symbol streams based on a different one of the split bit streams, and
    the input stream comprises at least two sections, each section comprising at least two groups of bits, each group of the at least two groups being demultiplexed to another one of the split bit streams and being given by one or more consecutive bits.

* * * * *